(12) United States Patent
Watson et al.

(10) Patent No.: US 10,621,562 B2
(45) Date of Patent: Apr. 14, 2020

(54) SECURE PAYMENT PROCESSING WITHIN MESSAGING SYSTEMS

(71) Applicant: NCR Corporation, Duluth, GA (US)

(72) Inventors: Patrick Goode Watson, Johns Creek, GA (US); Yehoshua Zvi Licht, Alpharetta, GA (US); Nir Veltman, Johns Creek, GA (US); Brent Vance Zucker, Roswell, GA (US)

(73) Assignee: NCR Corporation, Atlanta, GA (US)

( * ) Notice: Subject to any disclaimer, the term of this patent is extended or adjusted under 35 U.S.C. 154(b) by 758 days.

(21) Appl. No.: 15/275,015

(22) Filed: Sep. 23, 2016

(65) Prior Publication Data
US 2018/0089643 A1 Mar. 29, 2018

(51) Int. Cl.
*G06Q 20/08* (2012.01)
*G06Q 50/00* (2012.01)
*G06Q 20/38* (2012.01)
*G06Q 20/16* (2012.01)
*G06Q 20/22* (2012.01)

(52) U.S. Cl.
CPC .......... *G06Q 20/085* (2013.01); *G06Q 20/16* (2013.01); *G06Q 20/227* (2013.01); *G06Q 20/385* (2013.01); *G06Q 20/3821* (2013.01); *G06Q 50/01* (2013.01)

(58) Field of Classification Search
CPC ...... G06Q 20/00; G06Q 20/085; G06Q 20/22; G06Q 20/227; G06Q 50/01
See application file for complete search history.

(56) References Cited

U.S. PATENT DOCUMENTS

| 9,256,871 | B2 | 2/2016 | Anderson et al. |
|---|---|---|---|
| 2008/0177659 | A1* | 7/2008 | Lacey ................. G06Q 20/108 705/42 |
| 2014/0005263 | A1 | 1/2014 | Dalton et al. |
| 2014/0005893 | A1 | 1/2014 | Park |
| 2014/0007463 | A1 | 1/2014 | Bird et al. |
| 2014/0028911 | A1 | 1/2014 | Knee |
| 2016/0012536 | A1 | 1/2016 | Goyder et al. |

(Continued)

FOREIGN PATENT DOCUMENTS

WO 2014/113596 A1 7/2014

OTHER PUBLICATIONS

European Search Report dated Nov. 22, 2017 issued in co-pending European Patent Application 17190035.0.

*Primary Examiner* — Laura A Gudorf
(74) *Attorney, Agent, or Firm* — Schwegman, Lundberg & Woessner

(57) ABSTRACT

A user is initially registered during a session with a messaging platform through an out-of-band registration communication. When a user attempts to make a payment within the session or within subsequent sessions with the messaging platform or subsequent sessions with different messaging platforms, the user is presented token names representing registered forms of payment within the user's session. The selected token name is mapped outside the session to specific registered payment details and the payment processing is processed on behalf of the user during the session but through out-of-band session communications. Confirmation of payment is then sent back to the user in a session communication.

20 Claims, 7 Drawing Sheets

(56) References Cited

U.S. PATENT DOCUMENTS

2016/0119296 A1\* 4/2016 Laxminarayanan .......................... H04L 63/0428 713/168
2018/0018660 A1\* 1/2018 Gomes ............... G06Q 20/3821
2018/0048594 A1\* 2/2018 de Silva .................. H04L 51/02

\* cited by examiner

SECURE PAYMENT PROCESSING WITHIN MESSAGING SYSTEMS

BACKGROUND

Individuals and businesses utilize a variety of messaging technologies to: socialize, communicate, and engage in business activities. Some of these messaging technologies include: email platforms, text platforms, instant messaging platforms, browser-based platforms, and a variety of social media platforms. Each specific type of messaging platform has its own set of interfaces and features, some of which may be device-type specific or may work better (with more features) on a given device type. Furthermore, most messaging platforms include their own Application Programming Interfaces (APIs) that permit automated and program-based interaction with features of the messaging platforms.

As a result, businesses have little useful metrics as to how consumers are using messaging platforms to engage in activities with the businesses beyond direct interactions between an individual and a business over a specific messaging platform. The problem with this is that the messaging activity by an individual prior to that individual engaging a business is essentially unknowable with present technology and technology approaches.

Another issue with performing operations from messaging systems is the ease with which hackers can access communications in conventional messaging systems. For example, consider an individual that ones to make payment for a good or service through a chat/messaging system. Messaging systems are regularly subject to hacking and virus attacks. Therefore, permitting a messaging system to store a customer's payment method for transactions requiring payment is problematic and most customers are uncomfortable providing such payment methods for storage. Also, customers do not like providing payment methods on a per-transaction bases for a variety of reasons, such as it is cumbersome to do and takes time to do and the customers realize there is a lack of security within messaging systems and are reluctant to provide their confidential data on perceived unsecure messaging systems.

SUMMARY

In various embodiments, methods and a system for secure payment processing within messaging systems are presented.

According to an embodiment, a method for secure payment processing within a messaging system is provided. Specifically, and in one embodiment, a user is provided within a session with a messaging platform a token list for selection of a token. A selected token is obtained through the session from the user. Finally, a payment transaction is processed with an external service in response to the selected token.

DETAILED DESCRIPTION

Figure 1A:
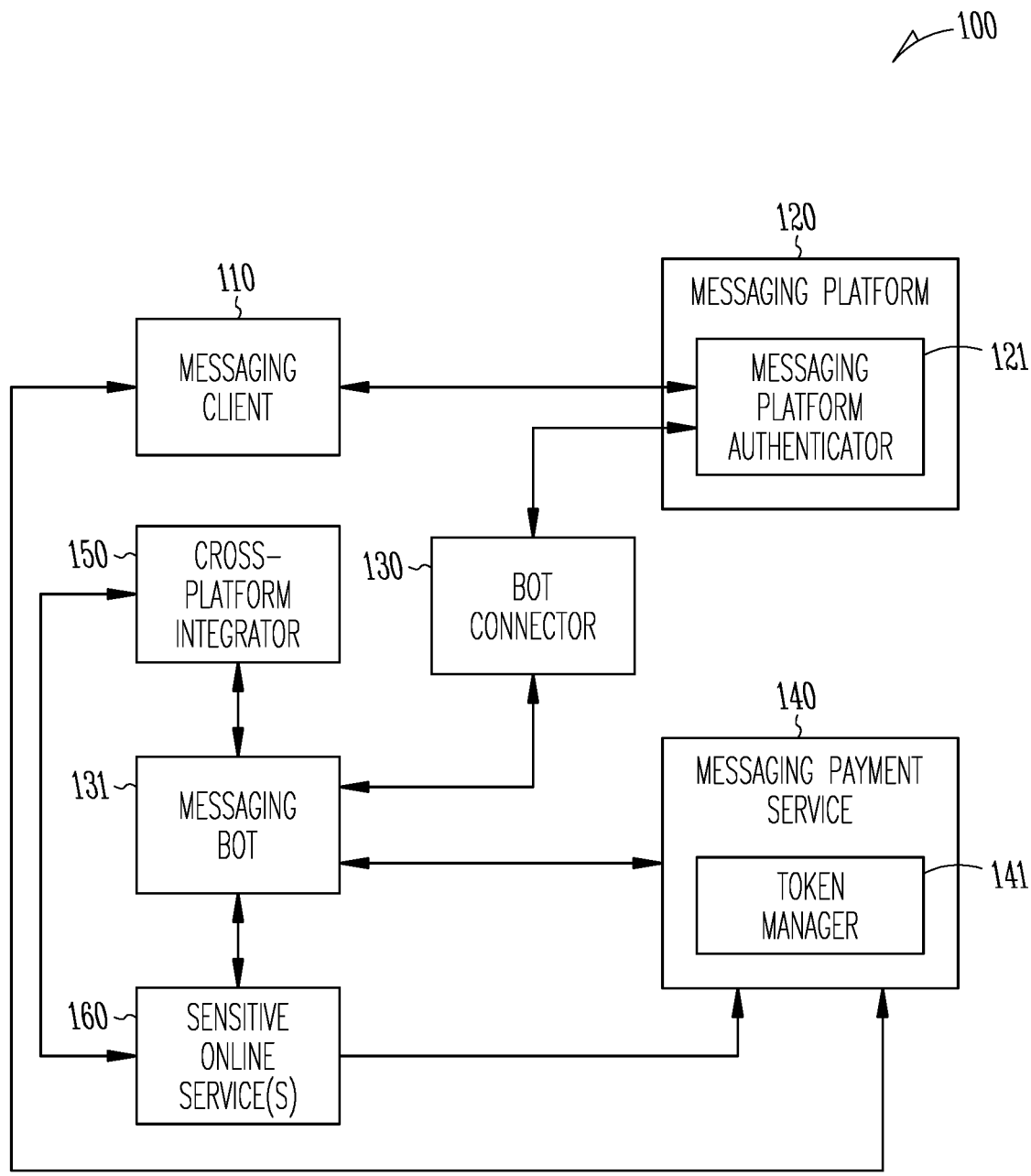
FIG. 1A is a diagram of a system for secure payment processing within a messaging system, according to an example embodiment.

FIG. 1A is a diagram of a system for secure payment processing within a messaging system, according to an example embodiment. The system 100 is shown schematically in greatly simplified form, with only those components relevant to understanding of one or more embodiments (represented herein) being illustrated. The various components are illustrated and the arrangement of the components is presented for purposes of illustration only. It is to be noted that other arrangements with more or less components are possible without departing from the secure payment processing within a messaging system techniques presented herein and below.

Moreover, various components are illustrated as one or more software modules, which reside in non-transitory storage and/or hardware memory as executable instructions that when executed by one or more hardware processors perform the processing discussed herein and below.

The techniques, methods, and systems presented herein and below for secure payment processing within a messaging system can be implemented in all, or some combination of the components shown in different hardware computing devices having one or more hardware processors.

The system 100 includes: a messaging client 110, a messaging platform 120, a bot connector 130, a messaging payment service 140, a cross-platform integrator 150, and at least one sensitive (network-based) online service 150. The messaging platform 120 includes a messaging platform authenticator 121. The bot connector 130 includes a messaging bot 131. The messaging payment service 140 includes token manager 141.

The messaging client 110 can be processed on any processor-enabled device, such as but not limited to: a desktop computer, a laptop computer, a mobile phone, a tablet, a wearable processing device (watch, goggles, etc.), a processor-enabled vehicle interface within a vehicle, an intelligent appliance (light switch, lamp, garage door opener, refrigerator, television, stereo, etc.), a server, etc.

As used herein, a "messaging platform" refers to the software, interfaces, APIs, processing devices, and network connectivity used to perform messaging communications by users. A messaging platform includes, by way of example only, email, Short Message Service (SMS) text, instant message, and social-media applications (e.g., Facebook™, Slack™, Twitter™, Instagram™, Snap Chat™, LinkedIn™, etc.).

As used herein, a "messaging bot" of "bot" refers to a software application that is designed to engage in messaging activities in an automated manner as an active or passive participant within multiple disparate messaging platforms. A messaging bot 131 is a logical participant in a given chat session (messaging session or dialogue) for any given messaging platform. Moreover, a messaging bot 131 is configured to perform a variety of pre-configured automated actions within messaging platforms and/or outside the messaging platforms.

In an embodiment, the messaging client 110 (is also referred to as a "messaging application (app)" 110) includes no software changes or modifications for interaction with messaging bot 131 to be operational and perform the processing discussed herein and below. That is, from the perspective of the messaging platform 120 and the messaging app 110, the messaging bot 131 (also referred to as "messaging bot 131 or bot 131, herein) is a real user or participant (albeit the bot 131 is a logical participant).

In an embodiment, it is to be noted that the bot 131 need not processing on a same device as the corresponding messaging app 110. So, all a user operating messaging app 110 need do is identify a participant of a chat session (initiated with messaging app 110) as being messaging bot 110 (by directing a message within the messaging app 110 to a unique participant identifier associated with the bot 131). The actually device that executes the bot 131 can be a server or cloud (set of logically cooperating servers).

In some embodiments, the bot 131 may process within the local processing contexts and on the devices that process the corresponding messaging apps 110.

One benefit by retaining the bot 131 in a cloud processing environment is that any updates and enhancements to the bot 131 can be achieved without updates to the devices having the messaging app 110. Furthermore, a single base version of the bot 131 can exist in the cloud and support multiple disparate users through use of user-customization profiles that include user-specific configurations of the bots 131. In this manner, when a specific user identifies the bot 131 in the messaging app 110, a cloud service can cause the base bot to be initiated and apply the that user's specific preferences/configurations to create a running instance of the bot 131 that is specific and customized to the user.

The bot 131 is configured to perform a variety of functions that are messaging platform 120 independent. That is, the bot 131 (through the bot connector 130) is designed to interact with the user of the messaging app 110 from the messaging platform interface and interact with the user from a different messaging client associated with a different messaging platform of the user. The bot connector 130 acts as an intermediary from the variety of disparate messaging platforms and translates messaging platform specific interfaces into a generic bot-based interface that is recognized and processed by the bot 131. Similarly, when the bot 131 responds in a generic bot-based interface, the bot connector 130 translates to a messaging-platform specific interface for deliver to the user in the messaging app 110.

It is noted that a plurality of customized bots can be provided with each bot 131 customized to perform one or more specific functions. For ease of illustration only a single messaging platform 120 and bot 131 is shown in the FIG. 1A.

The system 100 permits user activity across messaging platforms and with sensitive online services 160, which may or may not have interfaces associated with the messaging platforms. This is achieved through the processing of the messaging payment service 140 in connection with the bot connector 130 and the messaging bot 131.

Initially, a user accesses messaging client 110 and is authenticated with a user-identifier and credential (such as a password, fingerprint, etc.) by the messaging platform authenticator 121. The messaging platform authenticator 121 authenticates the user for access to the user's account with the messaging platform 120.

When the user is logged in successfully to the messaging platform 120, the event of successful login, an automated message sent from the messaging app 100, or the user sent message through the messaging app 110 is detected or received by a bot connector 130.

The bot connector 130 has access to at least two pieces of information from the user: an event or an assumption that an event existed indicating that the user is successfully logged into the messaging platform 120, and a user identifier, which the user is identified by within the messaging platform 120.

The user identifier for the messaging platform 120 is sent by the bot connector 130 to messaging bot 131 along with an indication that the user is logged into the messaging platform 120 through the messaging app 110. The bot 131 then interacts with a cross-messaging platform identity service (not shown in the FIG. 1A) to obtain an identity mapping for the user identifier within the messaging platform 120. This permits the bot 131 know user identifiers (personas) for the user in other messaging platforms and know user identifiers for the user in online services 160. In some cases, the cross-messaging platform identity service may return to the bot 131 a global identifier to assign to the user and the user's session with the messaging platform 120.

When the user sends a message within the session of the messaging platform that require a payment, the messaging bot 131 (through translations to and from the bot connector 130) receives the messaging with the order id (transaction identifier) and user's messaging platform user identifier. The bot 131 resolves the user id to a global id for the identity mapping of the user that spans messaging platforms and online services 160 and forwards the order id along with the user's mapped global id to the messaging payment service 140 making a requests for a unique token to be generated for this order id and this particular user for purposes of performing payment processing for an order of the user through and during the session that the user is having with the messaging platform.

In response, the messaging payment service 140 determines that the user associated with the global id has not registered any payment methods for payment processing within any messaging platform before. This is the initial registration being performed by the user. A registration Universal Resource Locator (URL) link is embedded in a message that will connect (when activated) the user through a browser (out-of-band for the session) communication to the messaging payment service. This message with the embedded URL link is forwarded back to the bot 131 and back through the messaging platform 120 to as an in-session message from the messaging payment service to the user on the messaging client 110.

When the user activates the embedded URL link within the message from the messaging platform interface and the session on the messaging client 110, the client of the user spawns a session out-of-band browser application that redirects and connects the user (through a separate browser window) with the messaging payment service 140. This is an encrypted connection (Hypertext Markup Language over Secure Sockets (HTTPS) and includes interface screens for the user to enter details for one or more payment methods, such as credit cards, bank cards, debit cards, gift cards, PayPal® accounts, etc. along with all the relevant details including account numbers, expiration dates, security code, billing address, billing zip code, name on the card, etc. This registration and communication of payment methods occurs outside of the messaging platform and none of this information is accessible from the messaging platform 120 and the user's session with the messaging platform 120 (although the session is ongoing through the messaging platform interface on the messaging client).

Once registration by the user has successfully been processed between the user and the messaging payment service 140 (through the session out-of-band communication), the messaging payment service 140 validates the payment methods. Assuming this was successful, the messaging payment service 140 sends a confirmation code indicating successful payment method registration back to the bot 131, which is delivered back to the user as a message within the session and within the messaging platform 120.

Next, the original order can be paid and communicated that is was paid within the session that the user is having with the messaging platform 120. The token manager generates a token name for each of the user's registered payment method. The list of registered payment methods for the user becomes a list of token names that mask the details of the true payment methods. The token manager generates the list of token names and interacts with the messaging bot 131 to have the bot 131 generate an in session message that is delivered to the user within the session of the messaging platform 120; the message includes the token name list and asks the user to select a token name for payment for the ongoing order id occurring through session communications within the messaging platform 120.

The user responds to the message within the session and over the messaging platform with the order id and a specific selected token name. This is communicated and translated back to the bot 131 through the bot connector 130, and the bot 131 delivers it to the token manager 141. The token manager 141 maps the token name identified in user-sent session message and uses the order id to locate the transaction requiring payment with an online service. The payment details associated with the token name is then processed by the token manager 141 to interact with an Application Programming Interface (API) of the online service 160 where payment is needed for the transaction along with a user identifier for the user that is recognized by the online service 160 and the order id. The token manager 141 or other interfaces of the messaging payment service 140 then processes the API to pay for the transaction associated with the order id on behalf of the user (this is an out-of-session communication but occurring while the user still has a session with the messaging platform 120).

The confirmation code returned indicating that payment was made by the customer is obtained by the messaging payment service 140 forwarded to the bot 131 delivered to the bot connector 130 and communicated as a confirmation code message back to the user within the message platform and during the ongoing session.

A few things of are import for this processing. First, outside of the out-of-band registration process, the user's payment methods and details for each payment method is never transmitted through the messaging platform 120. This means that a hacker of the messaging platform 120 or even the session of the messaging platform 120 has no ability to usurp the confidential payment details. All a hacker would see or be able to obtain is an innocuous token name. However, the token name is specific to an order id or transaction and the customer. Secondly, the only place where the payment details for the payment methods are stored is in an environment that is accessible only to the messaging payment service 140. This means the users can make secure payments through insecure messaging platforms.

Moreover, once the user registers payment methods, the user can use the bot 131 and messaging payment service 140 across multiple disparate messaging platforms associated with multiple user sessions with those platforms. This is so because the bot 131 and the messaging payment service 140 are messaging-platform independent and operate over multiple disparate messaging platforms. The bot connector 130 translates messaging-platform specific interfaces and data formats to a generic messaging-platform independent interface and data format. Moreover, the bot connector 130 translates from the generic bot interfaces and data formats to specific messaging-platform specific interfaces and data formats.

So, registration occurs once and thereafter the user has full payment processing integration that spans multiple sessions of the user with multiple messaging platforms.

Figure 1B:
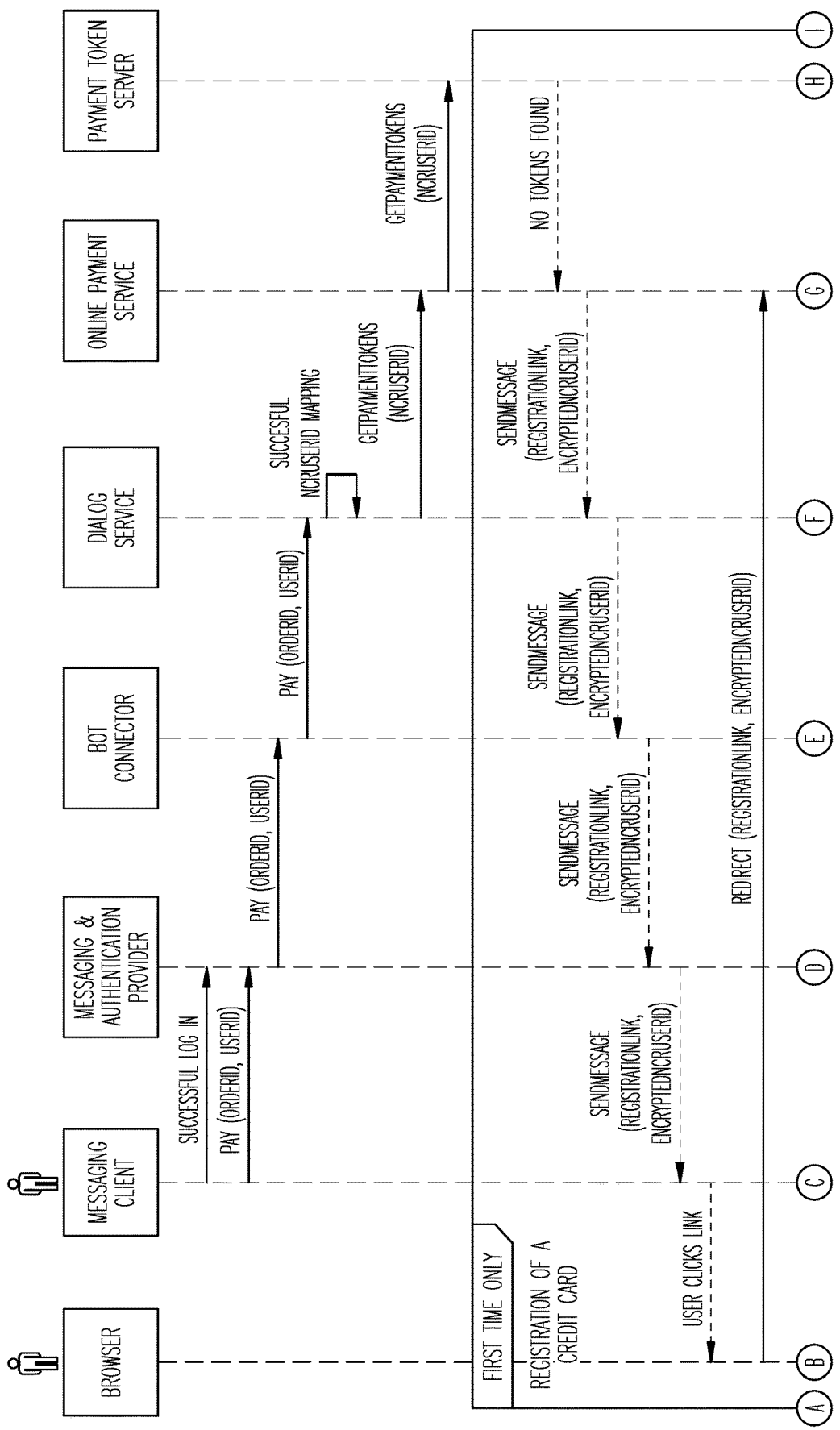
FIGS. 1B, 1C, and 1D represent diagrams of a sample processing flow for secure payment processing within a messaging system, according to an example embodiment.
Figure 1C:
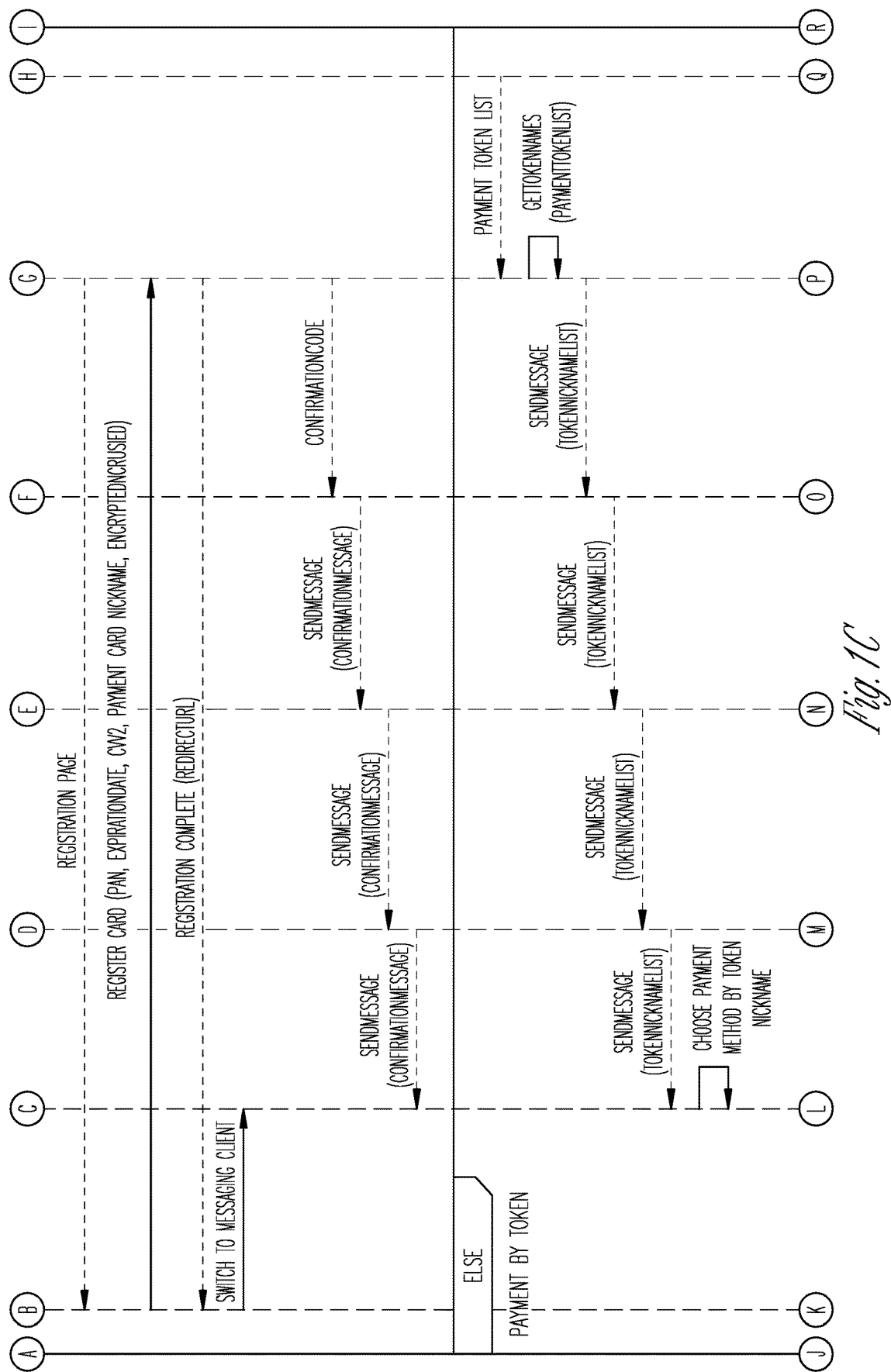
Figure 1D:
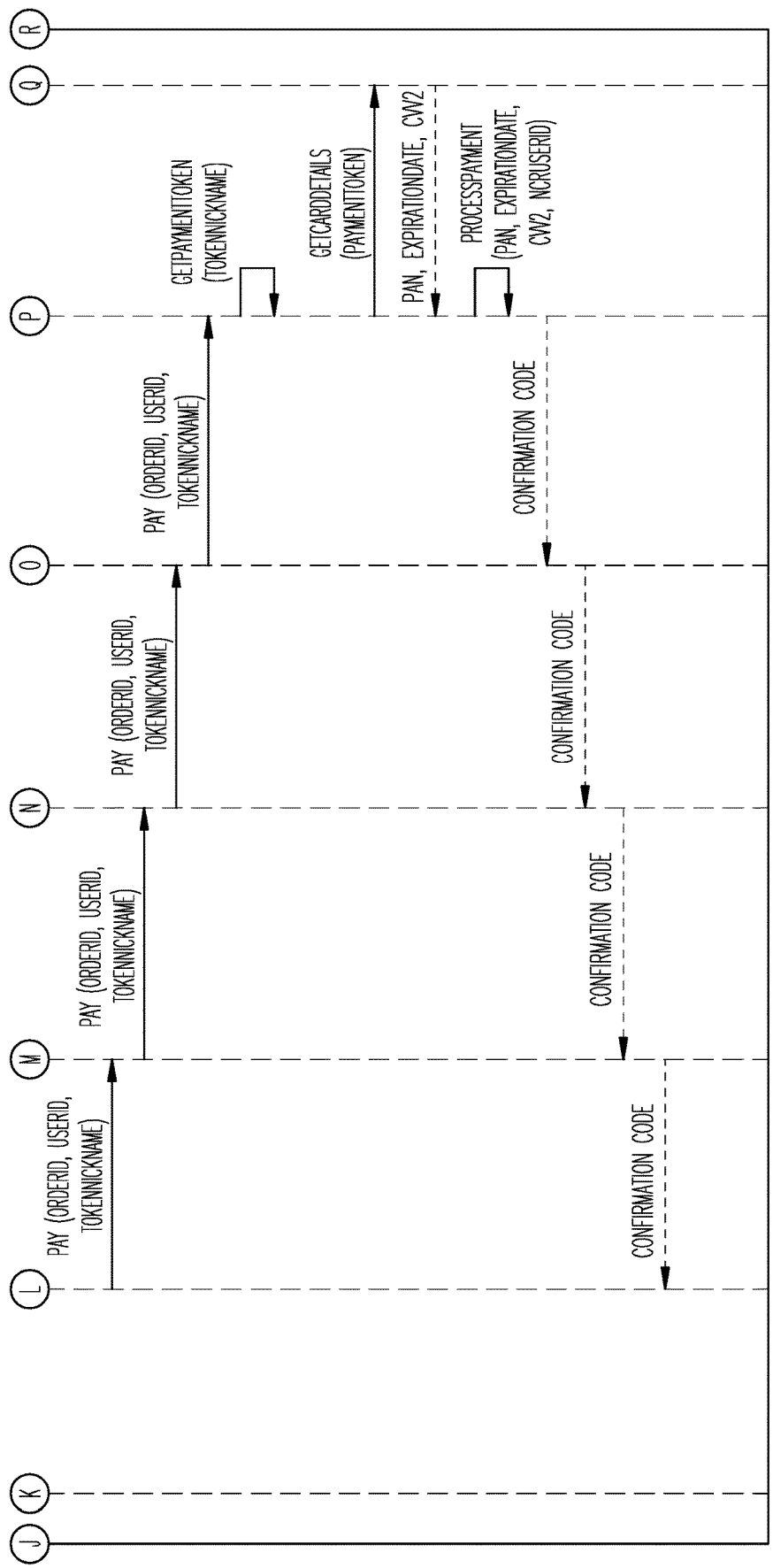

FIGS. 1B, 1C, and 1D represent diagrams of a sample processing flow for secure payment processing within a messaging system, according to an example embodiment.

The FIGS. 1B, 1C, and 1D show a more detailed processing payment processing and initial payment processing registration within a messaging platform 120. This provides enhanced security for messaging-platform payment processing and is accessible through multiple disparate messaging platforms.

Initially, the user accesses a messaging client 110 and is prompted to login to the user's existing account with a messaging platform 120 through a messaging authentication provider 121 of the messaging platform 120. This is forwarded to the bot connector 130 along to the bot 131 (identified as dialogue service in the FIGS. 1B, 1C, and 1D) and onto the identity management service (not shown in the FIGS. 1B, 1A, and 1C.) The bot 131 and/or the identity management service then maps the messaging platform specific identifier for the user within the session to a global identity recognized and mapped to multiple known identifiers for the user on multiple messaging platforms and with the online service 160. This ensures the ability of the processing described here can be provided and replicated regardless of the messaging platform being accessed by the user.

At some point during the session, the user engages the bot 131 for performing a payment transaction with the online service 160. The bot receives the order id and user identifier. The user identifier is mapped (or may already have been as discussed above) to the global identifier for the user (map to online service identifiers for the user and identifiers for the user with other messaging platforms).

The bot 131 makes a token request to the messaging payment service and/or token manager 141 providing the global identifier for the user. If this is the first time, the user is making a request for payment processing within this messaging platform or any other messaging platform, the messaging payment service 140 responds to the bot with a messaging indicating registration is need along with an embedded URL link back to the token manager 141 for performing the registration. This is forwarded back to the user within the session as a messaging-platform session message to the user. When the user activates the embedded URL link from the message, the client 110 of the user spawns an out-of-band browser window that connects the user to an interface of the token manager using secure communications, such as HTTPS. The user then provides through the interface the payment methods (one to many) and the corresponding payment details through that secure interface. Upon conclusion of registration, the token manage generates a confirmatory code indicating the success of registration and causes that message to be delivered back to the user through the messaging platform in a session message.

At this point, the user can now process the payment transaction that was initiated within the session through messaging-platform specific messages.

The token manager 141 generates token names representing each of the available registered payment methods of the user and sends this and the order id for the transaction as a session message to the user (through the bot 131 and bot connector 130). The user selects one of his token names for payment of the transaction and returns this to the bot connector 130, which is then delivered to the bot 131 and onto the token manager 141 and/or other interfaces of the messaging payment service 140.

The messaging payment service 140 makes the returned token name selection made by the user to the specific payment method and its payment details. The messaging payment service 140 then processes an API to engage the online service 160 with an identifier for the user that is recognized by the online service 160, the order id or transaction identifier, and the payment details and completes the transaction on behalf of the user with the online service 160.

The confirmation code returned from the online service 160 is then communicated back to the use as an in-session messaging-platform specific message.

At no time does the messaging platform have access to any payment methods and their corresponding payment details. Only the messaging payment service 140 and the online service 160 (which reside and operate outside the messaging platform 120) have access to such methods and their details.

One now appreciates how this novel payment processing permits payments within insecure messaging platforms without exposing any payment details (beyond a token name, which is meaningless to any hacker). This provides the ability to more seamlessly and securely integrate customer activity within messaging platforms (such as social media platforms).

The embodiments presented in the FIGS. 1A-1D and other embodiments are now discussed with reference to the FIGS. 2-4.

Figure 2:
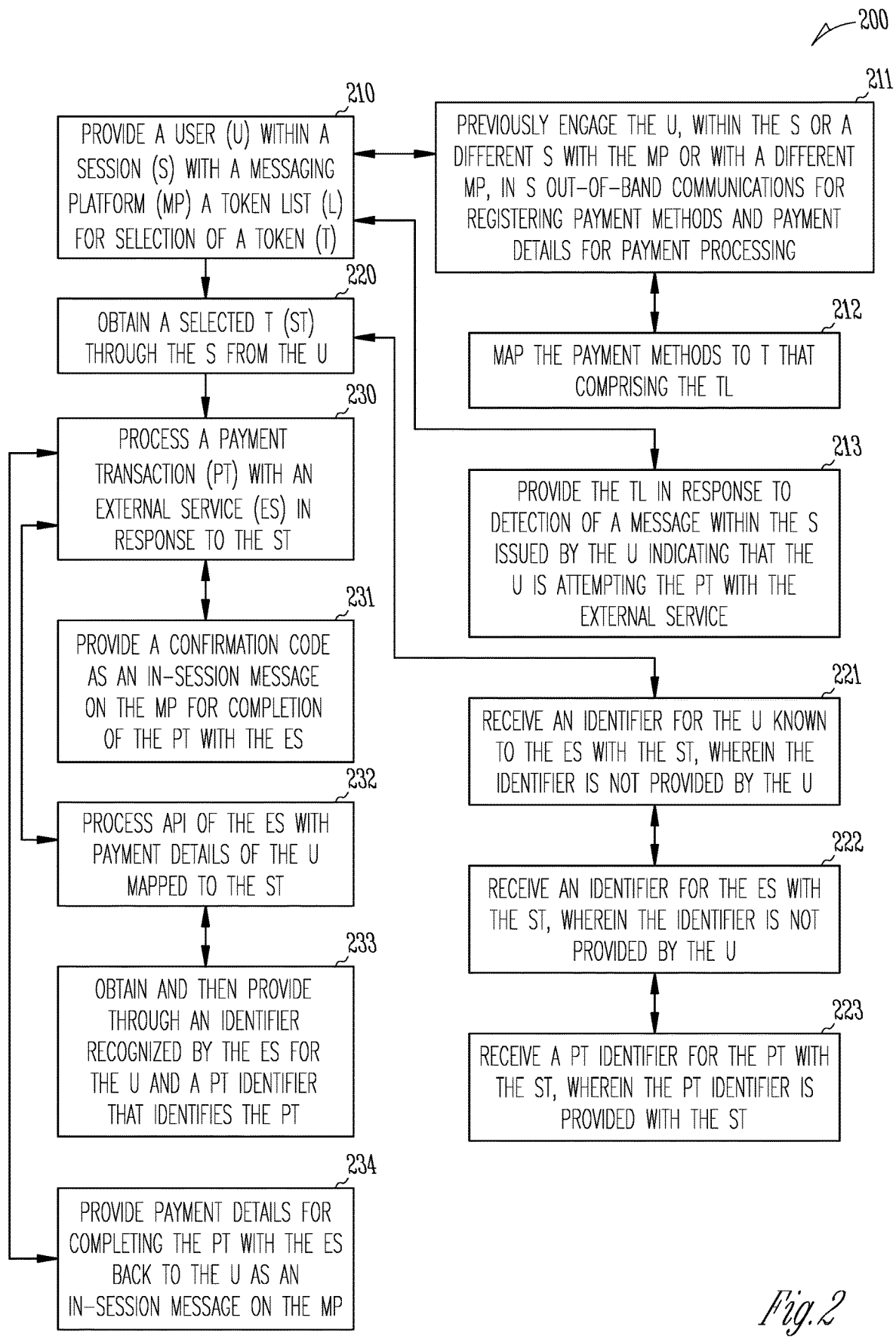
FIG. 2 is a diagram of a method for secure payment processing within a messaging system, according to an example embodiment.

FIG. 2 is a diagram of a method 200 for secure payment processing within a messaging system, according to an example embodiment. The software module(s) that implements the method 200 is referred to as an "secure messaging payment manager." The secure messaging payment manager is implemented as executable instructions programmed and residing within memory and/or a non-transitory computer-readable (processor-readable) storage medium and executed by one or more hardware processors of a hardware computing device. The processors of the device that executes the secure messaging payment manager are specifically configured and programmed to process the secure messaging payment manager. The secure messaging payment manager has access to one or more networks during its processing. The networks can be wired, wireless, or a combination of wired and wireless.

In an embodiment, the device that executes the secure messaging payment manager is the device or set of devices that process in a cloud processing environment.

In an embodiment, the device that executes the secure messaging payment manager is a server.

In an embodiment, the secure messaging payment manager is some combination of or all of: the bot connector 130, the bot 131, the messaging payment service 140, the token manager 141, and the cross-platform integrator 150.

At 210, the secure messaging payment manager provides a user within a session with a messaging platform a token list for selection of a token.

According to an embodiment, at 211, the secure messaging payment manager previously engaged the user within the session or a different session with the messaging platform or with a different messaging platform in session out-of-band communications for registering payment methods and payment details for payment processing. This registration process was discussed above in the FIGS. 1A-1D and is discussed below in the FIG. 3.

In an embodiment of 211 and at 212, the secure messaging payment manager maps the payment methods to tokens that comprise the token list. The tokens are all that is ever exposed with respect to payment information within the messaging platforms or other different messaging platforms used by the user.

In an embodiment, at 213, the secure messaging payment manager provides the token list in response to detection of a message within the session that is issued by the user indicating that the user is attempting the payment transaction with the external service.

At 220, the secure messaging payment manager obtains a selected token through the session from the user. That is, in-session messages from the user selects the token from the token list provided in 210.

In an embodiment, at 221, the secure messaging payment manager receives an identifier for the user that is known to the external service with the selected token. The identifier was not provided by the user; rather the secure messaging payment manager receives the user identifier from the bot 131, as described above in the FIGS. 1A-1D.

In an embodiment of 221 and at 222, the secure messaging payment manager receives an identifier for the external service with the selected token. The identifier for the external service is not provided by the user with the selection; rather, this is also received from the bot 131 as described in the FIGS. 1A-1D.

In an embodiment of 222 and at 223, the secure messaging payment manager receives a payment transaction identifier (order id) for the payment transaction with the selected token. The order id is received or provided by the user with the selected token communication within the session.

At 230, the secure messaging payment manager processes a payment transaction with an external service in response to the selected token.

According to an embodiment, at 231, the secure messaging payment manager provides a confirmation code as an in-session message on the messaging platform for completion of the payment transaction with the external service.

In an embodiment, at 232, the secure messaging payment manager processes an API of the external service with payment details mapped to the selected token.

In an embodiment of 232 and at 233, the secure messaging payment manager obtains and then provides through an identifier recognized by the external service for the user and a payment transaction identifier (order id) that identifies the payment transaction.

According to an embodiment, at 234, the secure messaging payment manager provides payment details for completing the payment transaction with the external service back to the user as an in-session message on the messaging platform.

Figure 3:
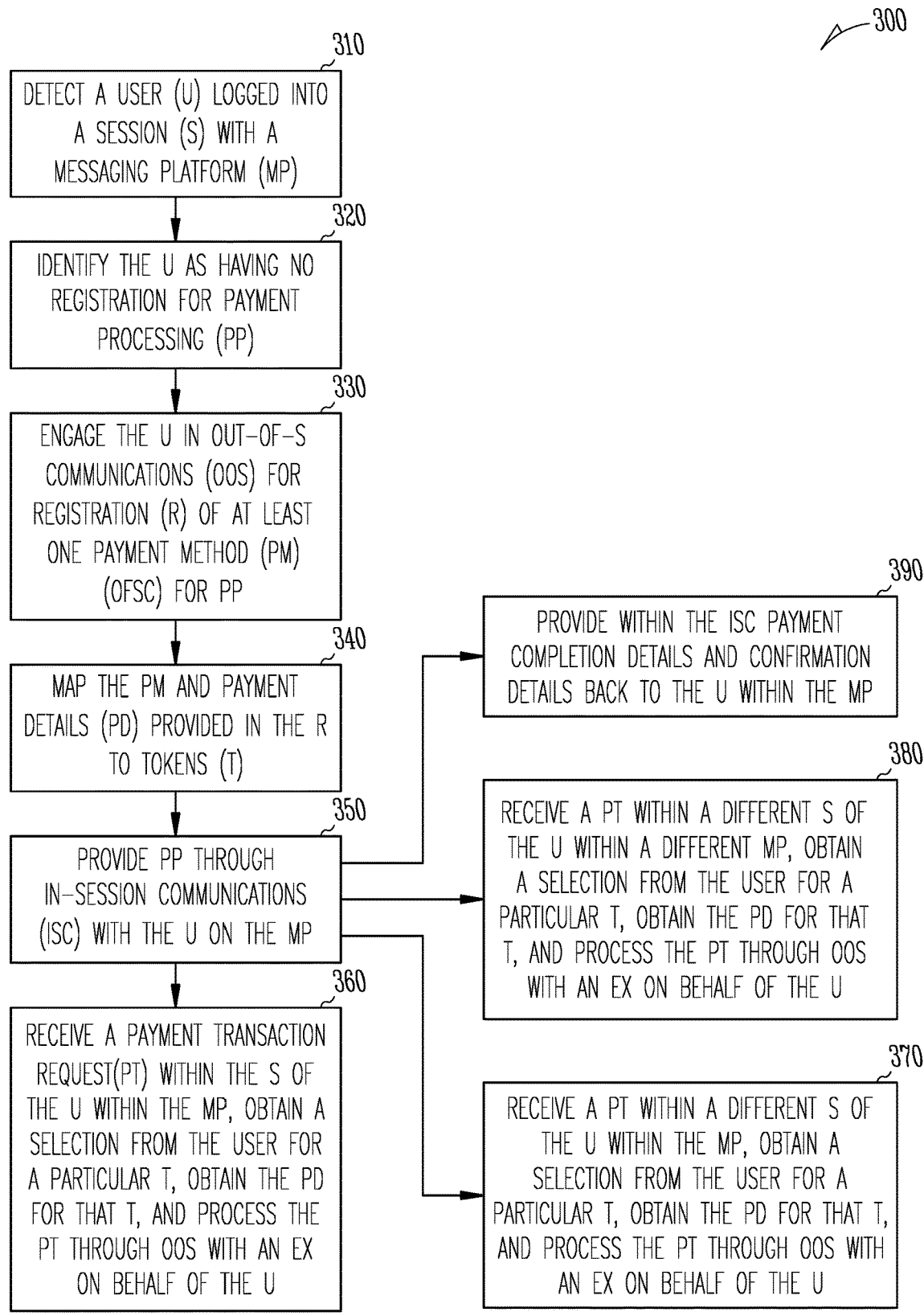
FIG. 3 is a diagram of another method for secure payment processing within a messaging system, according to an example embodiment.

FIG. 3 is a diagram of another method 300 for secure payment processing within a messaging system, according to an example embodiment. The software module(s) that implements the method 300 is referred to as an "cross-messaging platform secure payment manager." The cross-messaging platform secure payment manager is implemented as executable instructions programmed and residing within memory and/or a non-transitory computer-readable (processor-readable) storage medium and executed by one or more hardware processors of a hardware device. The processors of the device that executes the cross-messaging platform secure payment manager are specifically configured and programmed to process the cross-messaging platform secure payment manager. The cross-messaging platform secure payment manager has access to one or more networks during its processing. The networks can be wired, wireless, or a combination of wired and wireless.

The cross-messaging platform secure payment manager presents another and in some ways enhanced perspective of the method 200.

In an embodiment, the cross-platform voice authenticator is some combination of or all of: the bot connector 130, the bot 131, the messaging payment service 140, the token manager 141, the cross-platform integrator 150, and the method 200.

In an embodiment, the device that executes the cross-messaging platform secure payment manager is a server.

In an embodiment, the device that executes the cross-messaging platform secure payment manager is a cloud processing environment.

At 310, the cross-messaging platform secure payment manager detects a user logged into a session with a messaging platform.

At 320, the cross-messaging platform secure payment manager identifies the user as having no registration for payment processing by the cross-messaging platform secure payment.

At 330, the cross-messaging platform secure payment manager engages the user in out-of-session communications for registration of at least one payment method for payment processing.

At 340, the cross-messaging platform secure payment manager maps the payment method and payment details provided in the registration to tokens that mask the payment method and details.

At 350, the cross-messaging platform secure payment manager provides payment processing through in-session communications with the user on the messaging platform.

According to an embodiment, at 360, the cross-messaging platform secure payment manager receives a payment request within the session of the user within the messaging platform. The cross-messaging platform secure payment manager obtains a selection from the user for a particular token. Next, the cross-messaging platform secure payment manager obtains the payment details for that selected token. Finally, the cross-messaging platform secure payment manager processes the payment transaction through out-of-session communications with an external service on behalf of the user.

According to an embodiment, at 370, the cross-messaging platform secure payment manager receives a payment request within a different session of the user within the messaging platform. The cross-messaging platform secure payment manager obtains a selection from the user for a particular token. Next, the cross-messaging platform secure payment manager obtains the payment details for that selected token. Finally, the cross-messaging platform secure payment manager processes the payment transaction through out-of-session communications with an external service on behalf of the user.

According to an embodiment, at 380, the cross-messaging platform secure payment manager receives a payment request within a different session of the user within a different messaging platform. The cross-messaging platform secure payment manager obtains a selection from the user for a particular token. Next, the cross-messaging platform secure payment manager obtains the payment details for that selected token. Finally, the cross-messaging platform secure payment manager processes the payment transaction through out-of-session communications with an external service on behalf of the user.

In an embodiment, at 390, the cross-messaging platform secure payment manager provides within the in-session communications payment completion details and confirmation details back to the user within the messaging platform.

Figure 4:
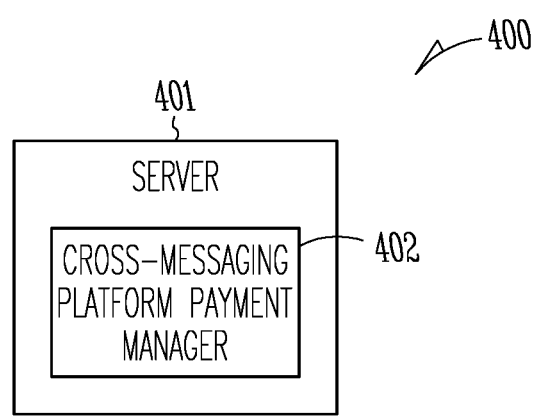
FIG. 4 is a diagram of another system for secure payment processing within a messaging system, according to an example embodiment.

FIG. 4 is a diagram of another system 400 for secure payment processing within a messaging system, according to an example embodiment. The system 400 includes a variety of hardware components and software components. The software components of the system 400 are programmed and reside within memory and/or a non-transitory computer-readable medium and execute on one or more hardware processors of a hardware device. The system 400 communicates one or more networks, which can be wired, wireless, or a combination of wired and wireless.

In an embodiment, the system 400 implements all or some combination of the processing discussed above with the FIGS. 1A-1B and 2-3.

In an embodiment, the system 400 implements, inter alia, the method 200 of the FIG. 2.

In an embodiment, the system 400 implements, inter alia, the method 300 of the FIG. 3.

The system 400 includes a server 401 and the server including a cross-messaging platform payment manager 402.

Cross-messaging platform payment manager 402 is configured to: 1) execute on at least one hardware processor of the server 401; 2) register a user within a session with a messaging platform for payment processing through out-of-session communications; 3) map payment methods and details obtained during the out-of-session communications to tokens; and 4) provide payment processing with external services on behalf of the user during the session, during a different session with the messaging platform, and during a different session with a different messaging platform based on a user selection of a token In an embodiment, the cross-messaging platform payment manager 402 is further configured to: 5) return receipt data back to the user within the session or different session upon completion of payment processing with the external services.

In an embodiment, the cross-messaging platform payment manager 402 is further configured to: 5) only provide and make available the payment methods and details to the external services during payment processing.

In an embodiment, the cross-messaging platform payment manager 402 is all or some combination of: the bot connector 130, the bot 131, the messaging payment service 140, the token manager 141, the cross-platform integrator 150, the system 100, the method 200, and the method 300.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
engaging in a session between a user and an external service within a messaging platform when the user includes an automated messaging bot as an active participant within the session;
mapping a user messaging platform identifier for the user to a global identifier associated with the user;
identifying, by the automated messaging bot, a payment transaction within the session;
acquiring a token list that is mapped to registered payment methods associated with the global identifier;
providing, by the automated messaging bot, the user the token list for selection of a token within the session on the messaging platform;
obtaining a selected token through the session from the user;
mapping the selected token to a selected registered payment method; and
processing the payment transaction with the external service in response to the selected token using an Application Programming Interface (API) to interact external to the session with an interface of the external service to provide the selected registered payment method on behalf of the user as payment for the payment transaction.

2. The method of claim 1, wherein the method further includes previously engaging the user, within the session using the automated messaging bot or a different session with the messaging platform using the automated messaging bot or with a different messaging platform using a different automated messaging bot, in session out-of-band communications for obtaining the registered payment methods and payment details for payment processing.

3. The method of claim 2, wherein previously engaging further includes mapping the registered payment methods to tokens that comprise the token list.

4. The method of claim 3, mapping further include generating the tokens to be unique to the user but so as to mask the payment details.

5. The method of claim 1, wherein providing further includes providing the token list in response to detection of a message within the session issued by the user indicating that the user is attempting the payment transaction with the external service.

6. The method of claim 1, wherein obtaining further includes receiving an identifier for the user known to the external service with the selected token, wherein the identifier is not provided by the user.

7. The method of claim 6, wherein receiving further includes receiving an identifier for the external service with the selected token, wherein the identifier is not provided by the user.

8. The method of claim 7 wherein receiving further includes receiving a payment transaction identifier for the payment transaction with the selected token, wherein the payment transaction identifier is provided with the selected token.

9. The method of claim 1, wherein processing further includes providing a confirmation code as an in-session message on the messaging platform for completion of the payment transaction with the external service.

10. The method of claim 1, wherein processing further includes processing the API with payment details of the user mapped to the selected registered payment method.

11. The method of claim 10, wherein processing further includes obtaining and then providing through the API an identifier recognized by the external service for the user and a payment transaction identifier that identifies the payment transaction.

12. The method of claim 1, wherein processing further includes providing payment details for completing the payment transaction with the external service back to the user as an in-session message on the messaging platform.

13. A method, comprising:
detecting a user logged into a session with a messaging platform based on the user including an automated messaging bot as an active participant in the session that is between the user and an external service;
matching a user messaging platform identifier for the messaging platform to a global identifier associated with the user;
identifying that the global identifier does not have a registration for automated in-session payment processing;
engaging the user in out-of-session communication for registration of at least one payment method for payment processing;
mapping payment methods and payment details provided in the registration to tokens;
and
providing automated payment processing through in-session communications with the user on the messaging platform utilizing the automated messaging bot, the global identifier of the user, and the tokens during the session or during a different session between the user and the external service or a different external service.

14. The method of claim 13 further comprising, receiving a payment transaction request within the session of the user within the messaging platform utilizing the automated messaging bot, obtaining a selection from the user for a particular token from in-session messages within the session, obtaining the payment details for that token, and processing the payment transaction through out-of-session communications with the external service on behalf of the user utilizing an Application Programming Interface associated with the external service.

15. The method of claim 13 further comprising, receiving a payment transaction request within a different session of the user within the messaging platform utilizing the automated messaging bot, obtaining a selection from the user for a particular token from in-session messages within the different session, obtaining the payment details for that token, and processing the payment transaction through out-of-session communications with the external service or different external service on behalf of the user utilizing an Application Programming Interface associated with the external service of the different external service.

16. The method of claim 13 further comprising, receiving a payment transaction request within a different session of the user within a different messaging platform utilizing a different automated messaging bot, obtaining a selection from the user for a particular token from in-session messages within the different session, obtaining the payment details for that token, and processing the payment transaction through out-of-session communications with an external service on behalf of the user utilizing an Application Programming Interface associated with the external service.

17. The method of claim 13 further comprising, providing within the in-session communications payment completion details and confirmation back to the user within the messaging platform utilizing the automated messaging bot.

18. A system (SST), comprising:
a server; and
a cross-messaging platform payment manager;
wherein the cross-messaging payment manager is configured to: (i) execute on at least one hardware processor of the server; (ii) register a user within a session with a messaging platform for payment processing through out-of-session communications, (iii) map payment methods and details obtained during the out-of-session communications to tokens, (iv) provide automated payment processing with external services on behalf of the user utilizing: the tokens, a global identifier for the user mapped to user messaging platforms' identifiers, automated messaging bots that are active participants of the session between the user and any of the external services, and Application Programming Interfaces (APIs) associated with the external services, based on a user selection of a token.

19. The system of claim 18, wherein the cross-messaging platform payment manager is further configured to: (v) return receipt data back to the user within the session upon completion of payment processing with any of the external services utilizing at least one of the automated messaging bots.

20. The system of claim 18, wherein the cross-messaging platform payment manager is further configured to: (v) only provide and make available the payment methods and details to the external services during payment processing.

* * * * *